United States Patent Office 3,836,566
Patented Sept. 17, 1974

3,836,566
1,1-DIBROMO-1-CYANOMETHANESULFON-
AMIDES
Christian T. Goralski, Midland, Mich., assignor to The
Dow Chemical Company, Midland, Mich.
No Drawing. Filed May 25, 1973, Ser. No. 364,174
Int. Cl. C07c 121/00, 121/16
U.S. Cl. 260—465.5 R                      5 Claims

ABSTRACT OF THE DISCLOSURE

The compounds of the formula

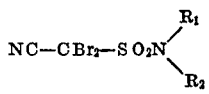

wherein $R_1$ and $R_2$ independently represent hydrogen or a lower alkyl group. The compounds are prepared by reacting a 1-cyanomethanesulfonamide with bromine in aqueous alkaline medium. The compounds have antimicrobial activity.

BACKGROUND OF THE INVENTION

The starting materials for several of the compounds of this invention, 1-cyanomethanesulfonamide and N-*iso*-butyl-1-cyanomethanesulfonamide are known; U.S. Pat. 2,978,482 and J. Chem. Soc., *1971*, C, 2151. They have no useful antimicrobial activity. No homologs, isomers or closely related analogs of the compounds of this invention are known.

SUMMARY OF THE INVENTION

This invention concerns 1,1-dibromo-1-cyanomethanesulfonamides corresponding to the formula

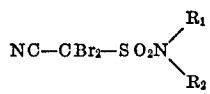

wherein $R_1$ and $R_2$ independently represent hydrogen or a lower alkyl group. The componnds are fine, white, crystalline solids which are soluble in water, and chlorinated solvents such as methylene chloride or chloroform, depending on the nature of the $R_1$ and $R_2$ groups. The compounds have antimicrobial activity and are particularly useful as slimicides for cooling towers, paper mills and the like. As used herein, "lower alkyl" designates an alkyl group having from 1, to 2, to 3, to 4 carbon atoms.

DESCRIPTION OF THE PREFERRED EMBODIMENTS

The compounds are prepared in the following way. The starting materials, 1-cyanomethanesulfonamide or N-alkyl analogs are suspended in water containing 2 moles of bromine per mole of starting material or substantially about 10 to 50% excess over the stoichiometric requirements of 2 moles of bromine per mole of starting material. A larger excess may be used but is not necessary. However, best results are achieved when substantially two moles of bromine per mole of starting material are utilized. Aqueous alkali metal hydroxide is added to the resulting suspension while it is mixed and cooled in an ice bath, in amount sufficient to neutralize evolved hydrogen bromide of reaction. The reaction mixture is then stirred for an additional short time until byproduct bromide is no longer formed, and the reaction mixture is extracted with a solvent for the product, e.g., chloroform, methylene chloride or ether. The organic extract containing the product is dried and the solvent is removed *in vacuo* to give a white solid product. The solid product may be recrystallized from an appropriate solvent where a purified product is desired, advantageously ether/hexane, or lower alkanols such as methanol or ethanol, to give the title compound as a white, crystalline solid. The structure is established by infrared and mass spectroscopy.

The following examples additionally describe representative specific embodiments and the best mode contemplated by the inventor of carrying out the invention.

EXAMPLE 1,1-dibromo-1-cyanomethanesulfonamide

In a 250 ml. flask equipped with a magnetic stirrer and a dropping funnel, place 2.40 g. (0.02 mol) of 1-cyanomethanesulfonamide, 30 ml. of water, and 6.40 g. (0.04 mol) of bromine The resulting solution is cooled in an ice-bath, and a solution of 1.60 g. (0.04 mol) of sodium hydroxide in 30 ml. of water is added dropwise thereto with stirring. After the addition is completed, the reaction mixture is stirred for one hour, then extracted with chloroform. The chloroform exract is dried and the chloroform is removed *in vacuo* to give a white solid. The solid is recrystallized from ether/hexane to give the title compound as a white, crystalline solid, m.p. 163–164° C.

In a similar manner, analogous compounds wherein one or both of the amido nitrogens is substituted with a lower alkyl group are prepared. There are thereby obtained, for example, 1,1-dibromo-1-cyano-N,N-dimethyl-methanesulfonamide, 1,1-dibromo-1-cyano-N,N - diethyl-methanesulfonamide, and 1,1-dibromo-N-*iso* - butyl - 1-cyanomethanesulfonamide.

The compounds of the invention are employed as antimicrobials for the control of bacteria, fungi and yeasts. This is not to suggest that all of the compounds are equally effective against all of the organisms at the same concentrations. For such uses, the compounds can be employed in an unmodified form or dispersed on a finely divided solid and employed as dusts. Such mixtures can also be dispersed in water with the aid of a surface-active agent and the resulting emulsions employed as sprays. In other procedures, the products can be employed as active constituents in solvent solutions, oil-in-water or water-in-oil emulsions. The augmented compositions are adapted to be formulated as concentrates and subsequently diluted with additional liquid or solid adjuvants to produce the ultimate treating compositions. Good results are obtained when employing compositions containing antimicrobial concentrations and usually from about 50 to 10,000 parts by weight of one or more of the compounds per million parts of such compositions.

In representative operations, the compounds of the present invention when tested for their activity as antimicrobials using conventional agar dilution tests give complete or substantially complete growth inhibition against *P. aeruginosa* and Sp Strain 10, *E. coil, C. albicans, T. mentagrophytes, B. subtilis, A. aerogenes, A. terreus, C. pelliculosa, S. typhosa, M. phlei, R. nigricans, C ips* and *C. fragans* at 50 to 500 p.p.m. of compound.

The starting materials for the compounds of this invention are prepared as follows: 1-cyanomethanesulfonamide according to the procedure of J. Weinstock, U.S. Pat. 2,978,482, and the N-alkyl-1-cyanomethanesulfonamides according to the procedure of M. P. Sammes et. al., *J. Chem. Soc.*, 2151 (1971, C.).

What is claimed is:
1. A compound corresponding to the formula

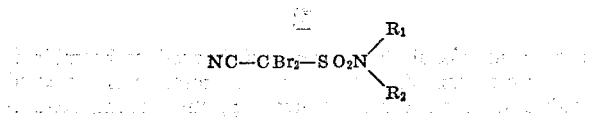

wherein $R_1$ and $R_2$ independently represent hydrogen or a 1 to 4 carbon atom lower alkyl group.

2. The compound of Claim 1 which is 1,1-dibromo-1-cyanomethanesulfonamide.

3. The compound of Claim 1 which is 1,1-dibromo-1-cyanomethane-N,N-dimethylsulfonamide.

4. The compound of Claim 1 which is 1,1-dibromo-1-cyanomethane-N,N-diethylsulfonamide.

5. The compound of Claim 1 which is 1,1-dibromo-N-iso-butyl-1-cyanomethanesulfonamide.

References Cited
UNITED STATES PATENTS
2,978,482  11/1973  Weinstock _____ 260—465.5 R OTHER REFERENCES
Sammes et al.: J. Chem. Soc., *1971* (C.), pp. 2151–2155.

JOSEPH P. BRUST, Primary Examiner

U.S. Cl. X.R.
260—456.7; 424—304